United States Patent
Goulden et al.

(10) Patent No.: US 10,747,429 B2
(45) Date of Patent: Aug. 18, 2020

(54) COMPENSATING FOR USER HAND TREMORS WHEN USING HAND-HELD ELECTRONIC DEVICES

(71) Applicant: INTERNATIONAL BUSINESS MACHINES CORPORATION, Armonk, NY (US)

(72) Inventors: Samuel D. Goulden, Winchester (GB); William E. Sawyer, Winchester (GB); Andrew J. Seymour, Southampton (GB); Peter Weller, Portsmouth (GB)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 16/052,020

(22) Filed: Aug. 1, 2018

(65) Prior Publication Data
US 2020/0042170 A1    Feb. 6, 2020

(51) Int. Cl.
G06F 3/0488    (2013.01)
G06F 3/01    (2006.01)
G06F 3/041    (2006.01)

(52) U.S. Cl.
CPC .......... *G06F 3/04886* (2013.01); *G06F 3/013* (2013.01); *G06F 3/017* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 6,211,856 B1 | 4/2001 | Choi et al. | |
| 8,443,302 B2 | 5/2013 | Zhang | |
| 9,430,137 B2 | 8/2016 | Nakamura | |
| 2003/0214481 A1 | 11/2003 | Xiong | |
| 2008/0055259 A1* | 3/2008 | Plocher | G06F 3/011 345/173 |
| 2014/0052275 A1 | 2/2014 | Pathak | |
| 2015/0052481 A1* | 2/2015 | Ronkainen | G06F 3/0416 715/815 |
| 2015/0199111 A1* | 7/2015 | Okada | G06F 3/04817 715/835 |
| 2017/0228025 A1* | 8/2017 | Hall | G06F 3/017 |
| 2018/0024661 A1* | 1/2018 | Lin | G06F 3/0418 345/173 |

OTHER PUBLICATIONS

Bing search q=compensate%20tremor%20gesture%20g (Year: 2020).*

(Continued)

*Primary Examiner* — Cesar B Paula
*Assistant Examiner* — John M Heffington
(74) *Attorney, Agent, or Firm* — Michael A. Petrocelli

(57) ABSTRACT

Method and system are provided for compensating for user hand tremors when using a hand-held electronic device having a user interface display. The method includes monitoring position data of a user's finger in relation to the user interface display over time as the finger approaches an element in the user interface display. A target element is determined by predicting an intended movement of the user's finger and the method dynamically enlarges the determined target element in the user interface display as the user's finger approaches the user interface display.

10 Claims, 6 Drawing Sheets

(56) References Cited

OTHER PUBLICATIONS

Bing search q=mitigate%20tremor%20gesture%20gui (Year: 2020).*
Bing search q=mitigate+tremor+gesture+user+inte (Year: 2020).*
Goulden, et al., "Compensating for User Hand Tremors When Using Hand-Held Electronic Devices", U.S. Appl. No. 16/520,949, filed Jul. 24, 2019.
List of IBM Patents or Patent Applications Treated as Related. Filed Jul. 29, 2019. 2 pages.
Goel et al, "WalkType: Using Accelerometer Data to Accommodate Situational Impairments in Mobile Touch Screen Text Entry", CHI 2012, May 5-12, 2012, Austin, Texas, USA, pp. 2687-2696.
Plaumann et al, "Improving Input Accuracy on Smartphones for Persons who are Affected by Tremor using Motion Sensors", Proceedings of the ACM on Interactive, Mobile, Wearable and Ubiquitous Technologies, vol. 1, No. 4, Article 156. Publication date: Dec. 2017, Ulm University, Germany, pp. 156:1-156:30.
Verily, "Eat with confidence", LIFTWARE by verifly, https://www.liftware.com, Printed on May 24, 2018, p. 1 of 1.
Staff Writer, "New Touchscreen Keyboard Adapts to User's Finger Size, IBM Patent", http://www.itproportal.com/2011/07/27/new-touchscreen-keyboard-adapts-user-finger-size-ibm-patent/, ITProPortal, Jul. 27, 2011, pp. 1-3.
Popa, "Tracking hand tremor on touchscreen", Thesis at the Media Computing Group, RWTH Aachen University, https://hci.rwth-aachen.de/materials/publications/popa2012a.pdf, Mar. 21, 2012, pp. 1-99.
Rouaissia, "Enhancing Touchscreen Experience by Adding Proximity Detection and Haptics Feedback", Consumer Analog Products Semtech Neuchâtel Sàrl CH-2000 Neuchâtel, Switzerland, crouaissia@semtech.com, pp. 1-3.
"The SteadyMouse Project", Steady Mouse.com, https://www.steadymouse.com/, removing tremors from mouse pointer, May 2, 2018, pp. 1-2.
Wang, "Supporting Trembling Hand Typing", vol. 5, Published in: IEEE Access, Jun. 20, 2007, pp. 1-16.
Wang, et al., "Supporting Trembling Hand Typing Using Optical See-Through Mixed Reality", Published in: IEEE Access (vol. 5), Date of Publication: Jun. 7, 2017, pp. 10700-10708, <https://ieeexplore.ieee.org/document/7941993>.

* cited by examiner

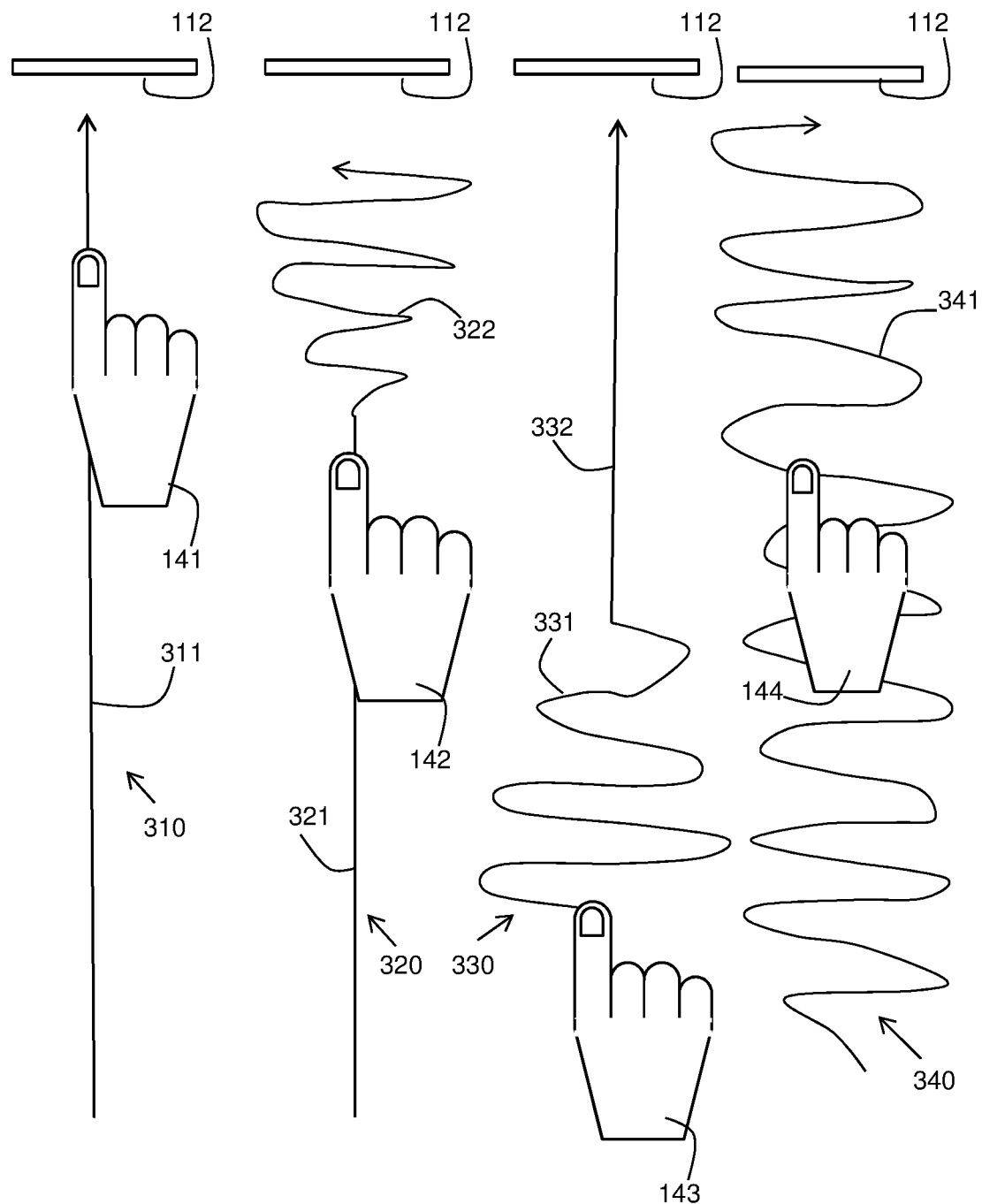
FIG. 3A     FIG. 3B     FIG. 3C     FIG. 3D

COMPENSATING FOR USER HAND TREMORS WHEN USING HAND-HELD ELECTRONIC DEVICES

BACKGROUND

The present invention relates to assistive technology, and more specifically, to compensating for user hand tremors when using hand-held devices.

When a user has involuntarily movement in their hands, they can often find it difficult to interact with hand-held electronic devices. The hand that holds the device may tremor as well as a finger used for interacting with a touchscreen user interface.

Many hand-held electronic devices have touchscreens providing a graphical user interface for input by the user. The graphical user interface interaction often includes selecting a small element on the graphical user interface using a pointing finger. In particular, an area of the graphical user interface may provide a keyboard for typing on a virtual keyboard. A lack of fine motor control often means that a user cannot communicate accurately, quickly or, in some cases, at all using the touchscreen graphical user interface.

Touchscreen graphical user interface are known in which when an element is selected by touch, a zoomed in version of the element is displayed so the user may be sure he has selected the correct element. However, the element is already selected and, if it is incorrect, requires deleting or undoing before selecting a correct element.

SUMMARY

According to an aspect of the present invention there is provided a computer-implemented method for compensating for user hand tremors when using a hand-held electronic device having a user interface display, comprising: monitoring position data of a user's finger in relation to the user interface display over time as the finger approaches an element in the user interface display; determining a target element by predicting an intended movement of the user's finger; and dynamically enlarging the determined target element in the user interface display as the user's finger approaches the user interface display.

According to another aspect of the present invention there is provided a system for compensating for user hand tremors when using a hand-held electronic device having a user interface display, comprising: a processor and a memory configured to provide computer program instructions to the processor to execute the function of the components: a position monitoring component for monitoring position data of a user's finger in relation to the user interface display over time as the finger approaches an element in the user interface display; a target determining component for determining a target element by predicting an intended movement of the user's finger; and an element enlarging component for dynamically enlarging the determined target element in the user interface display as the user's finger approaches the user interface display.

According to another aspect of the present invention there is provided a computer program product for compensating for user hand tremors when using a hand-held electronic device having a user interface display, the computer program product comprising a computer readable storage medium having program instructions embodied therewith, the program instructions executable by a processor to cause the processor to: monitor position data of a user's finger in relation to the user interface display over time as the finger approaches an element in the user interface display; determine a target element by predicting an intended movement of the user's finger; and dynamically enlarge the determined target element in the user interface display as the user's finger approaches the user interface display.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIGS. 3A, 3B, 3C and 3D are three schematic diagrams illustrating different types of tremor as accommodated by the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide technology to help users with tremors in their hands interact with a hand-held electronic device. The method may specifically help a user to type on a keyboard but may be extended to other areas where precision in user interaction with a graphical user interface is needed.

Figure 1A:
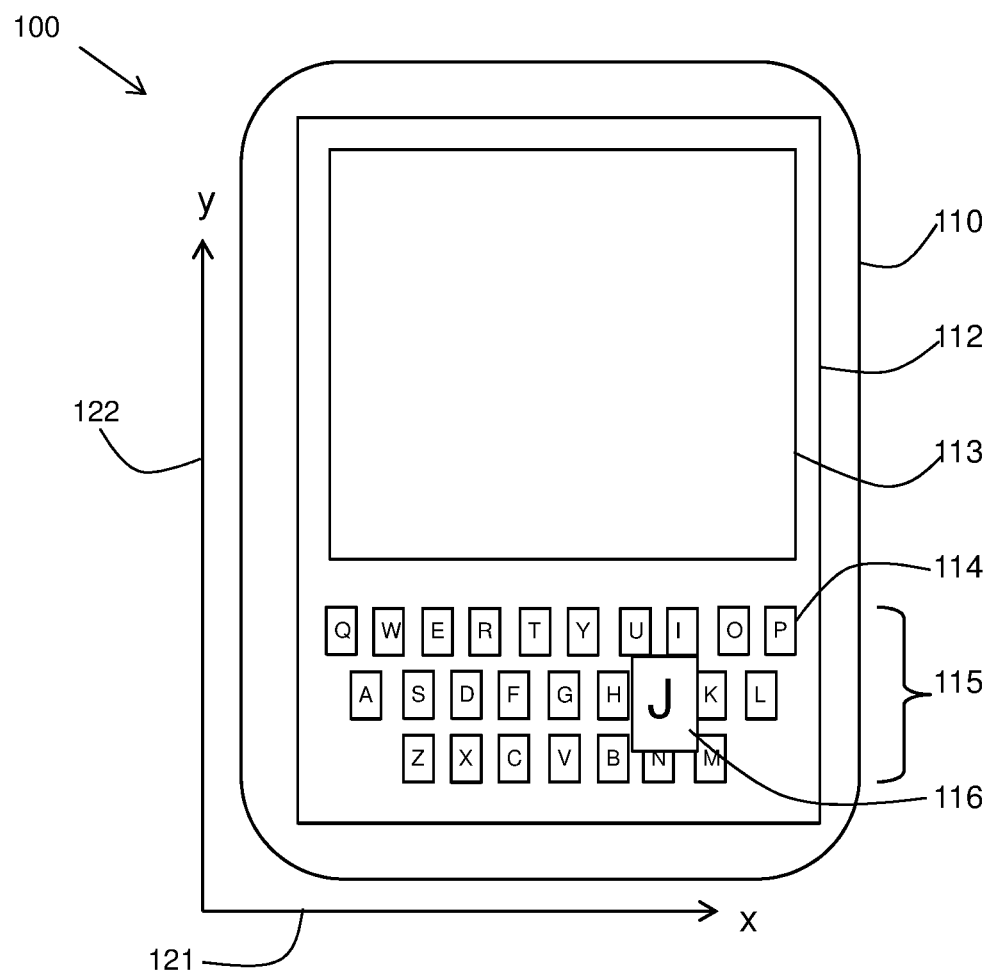
FIGS. 1A and 1B are schematic diagrams showing a front view and a top view of a hand-held electronic device with a user interaction illustrated in accordance with an the present invention.
Figure 1B:
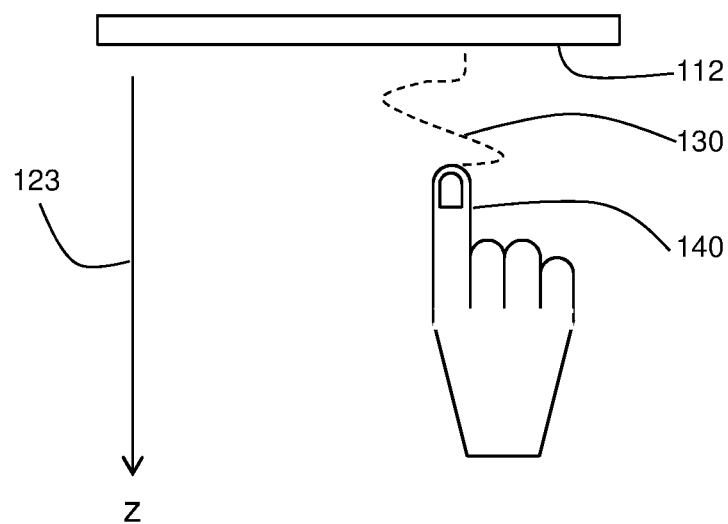

Referring to FIG. 1, a schematic diagram 100 illustrates an example hand-held electronic device 110 in which the described method and system may be implemented. The hand-held electronic device 110 may be a mobile device such as a cell phone or tablet with a touchscreen graphical user interface 112.

During interaction with a graphical user interface 112, the user interface (UI) may display a keyboard 115 of selectable UI control elements 114 representing keys and a text area 113 may display the resulting textual input.

The graphical user interface 112 may have a surface with (x,y) 121, 122 coordinates defining positions on the surface. A third dimension (z) 123 extends out of the graphical user interface 112 and may be used to measure a distance a user's finger 140 is away from the surface of the graphical user interface 112.

A path 130 illustrates a movement of a user's finger as it approaches the surface of the graphical user interface 112 when the user has a tremor. The described method and system provide functionality to display an enlarged version 116 of a UI element that is determined to be the target of the user's finger as it approaches the graphical user interface 112.

Figure 2A:
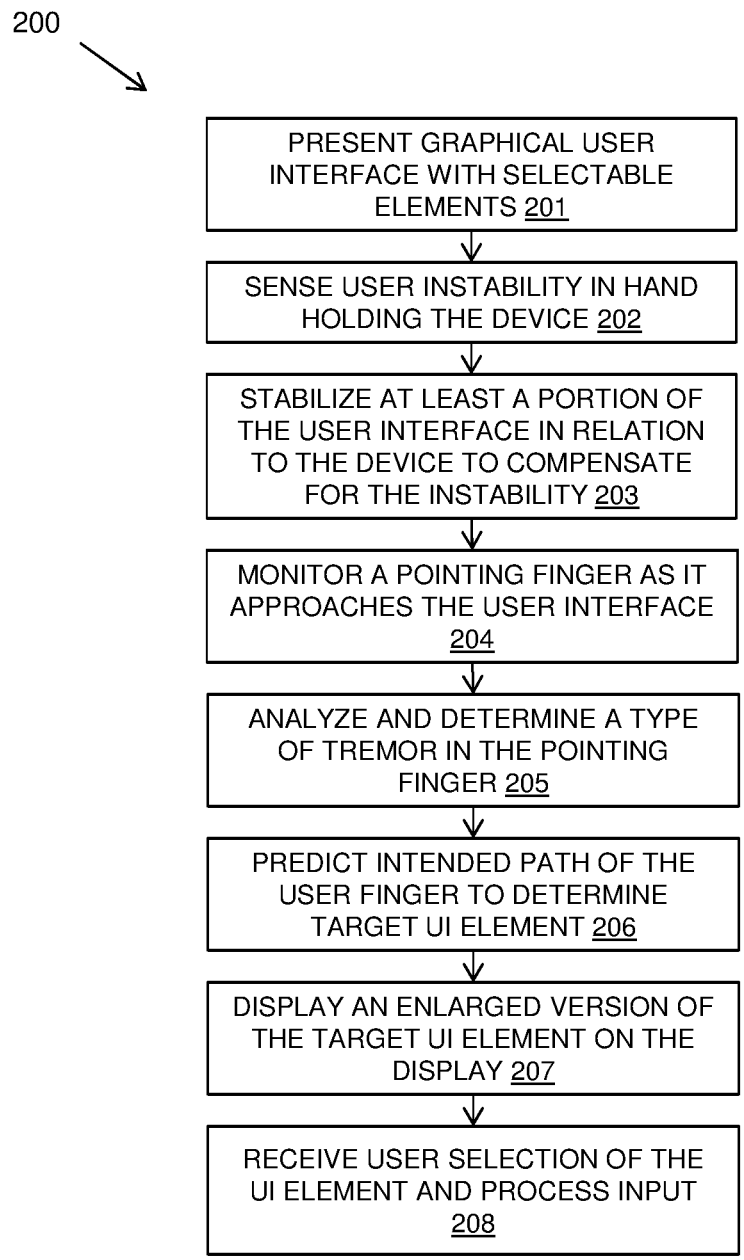
FIG. 2A is a flow diagram of an example embodiment of a method in accordance with the present invention.

Referring to FIG. 2A, a flow diagram 200 shows an example embodiment of the described method carried out at a hand-held user device during a user interaction with a graphical user interface.

The method may present 201 a graphical user interface display to a user in the form of a touchscreen with selectable elements. Selectable elements may be control elements or control widgets that provide an interaction with the graphical user interface. Selectable elements are software component that a computer user interacts with through direct manipulation to read or edit information in an application. Selectable elements may require a single touch with a user's finger, or a gesture or scrolling motion.

The method may sense 202 instability of a user's hand holding the device by sensing accelerometer data of the device. A least a portion of the user interface display may be stabilized 203 in relation to the device to compensate for the instability of the user's hand.

For example, a keyboard display may be stabilized with the accelerometer and may adjust the screen position of the keyboard display based on the tremors in the hand holding the device. The keyboard display may be less than the full width of the display screen so the stabilized keyboard display moves within the display screen and the user can still use all the keys whilst the stabilization is in progress.

The method may monitor 204 the position of a user's finger above the display screen of the device over time as the user's finger approaches the screen using proximity sensors. Proximity sensors may be capacitive sensors, video sensors, or movement detecting sensors. Capacitive sensors may be provided as an array around or behind a touchscreen and may detect a user's finger as it approaches the screen due to a sensed change in capacitance. The proximity sensors may gather position data for the user's finger during each approach to the screen.

The method may analyze 205 the position data to determine a type of tremor a user has in their pointing finger. This may be discovered from one interaction with the device or through multiple interactions. The position data may be matched to characteristics of existing tremor types. Further details of such tremor types and characteristics are provided in relation to FIGS. 3A to 3D.

The method may predict 206 an intended path of the user's finger to determine a target user interface element. The target user interface element is the element that the user is intending to touch with his finger before interacting with the element in some manner. The prediction may use various methods including averaging of position data and using tremor type to predict the intended path. The type of tremor may be used to select a compensation method used in the prediction. An example embodiment of a method of prediction is described in relation to FIG. 2B.

The prediction may, in addition to using the position data of the user's finger and optionally the tremor type, use context analysis to predict a next input and/or eye tracking to determine where a user is looking on the display.

As the user's finger approaches the screen, the method may display 207 an enlarged version of a current target user interface element on the display. The target element may change as the predicted intended path is updated as the user's finger approaches the display. The target elements on the user interface display may zoom in and produce larger hit areas for one or more target elements as the user's finger approaches. A single element may be enlarged, or multiple elements may be enlarged by different amounts based on the likelihood of that element being the target element.

The method may receive 208 a user's selection of a user interface element by the finger touching the display and may process the input as usual. The selected user interface element may be the enlarged predicted target or may be another user interface element that the user has selected instead.

Figure 2B:
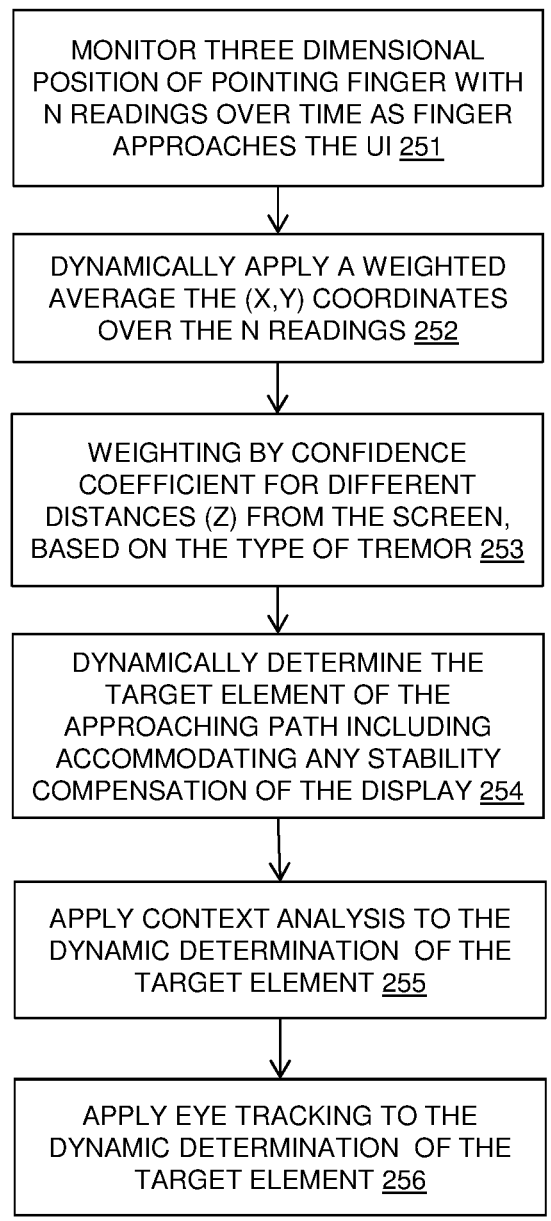
FIG. 2B is a flow diagram of an example embodiment of an aspect of the method of FIG. 2A.

Referring to FIG. 2B, a flow diagram 250 shows an example embodiment of an aspect of the described method of FIG. 2A.

The method may monitor 251 a three dimensional position of a user's pointing finger with n readings over time as the finger approaches the user interface display.

The method may dynamically apply 252 a weighted average of the (x,y) coordinates over the n readings according to the following equation:

$$\frac{\sum_{i=0}^{n}(M_{zi}(x_i, y_j))}{\sum_{i=0}^{n} M_{zi}}$$

Where $M_{zi}$ is the weighting 253 by confidence coefficient allowing more certainty at different (z) levels to accommodate different tremors types and n is the number of readings.

The method may dynamically determine 254 a target element of the approaching path including accommodating any stability compensation of the display. The target element may be constantly calculated based on the average as new readings in the (z) level become available.

The method may apply 255 context analysis to the dynamic determination to provide a higher confidence to a prediction of what target element a user is intending to select. As an element is approached, the method may provide additional influences on the predictions by using predictive text and other context analysis for other inputs based on confidence. Based on the context analysis and the average position, the user interface elements may become larger or smaller relative to each other.

In one embodiment, n-gram analysis may be used to predict what letters are likely to be used next in an input string. For example, if the user types in "formatti" n-gram analysis can be used to determine that the letter most likely to be typed next is "n". N-gram analysis may be used on words as well as individual letters, so a next word may be predicted that may be shown on the screen for selection.

The method may also apply 256 eye-tracking to the dynamic determination of the target element. Eye tracking may be used to enhance the accuracy of the process and may be used in conjunction with any stabilization of the display. The method may determine a user interface element that the user is looking at within the display and may increase the confidence of such an element as being the target element.

Referring to FIGS. 3A to 3D, different types of tremor that a user may have the distinguishing patterns of the different types of tremor are illustrated. In each figure, a user finger 141, 142, 143, 144 makes a path 310, 320, 330, 340 as it approaches a user interface 112.

FIG. 3A shows a movement of a finger 141 along a path 310 that is steady 311 and does not have a tremor.

FIG. 3B shows an intention tremor in which the movement of the finger 142 along the path 320 starts off being steady 321 and becomes more erratic 322 as the finger 142 approaches the user interface 112. A compensation method for this type of intention tremor applies a greater confidence to the accuracy of earlier monitored positions of the user's finger.

FIG. 3C shows a Parkinsonian tremor in which the movement of the finger 143 along the path 330 starts off by being erratic 331 becomes less erratic and steady 332 as the finger 143 approaches the user interface 112. The compensation method for this type of tremor applies a lesser confidence to the accuracy of earlier monitored positions of the user's finger.

FIG. 3D shows an essential tremor in which the movement of the finger 144 along a path 144 is constantly erratic 341 as the finger approaches the user interface 112. The compensation method for this type of tremor applies an equal confidence to the accuracy of earlier monitored positions of the user's finger.

Figure 4:
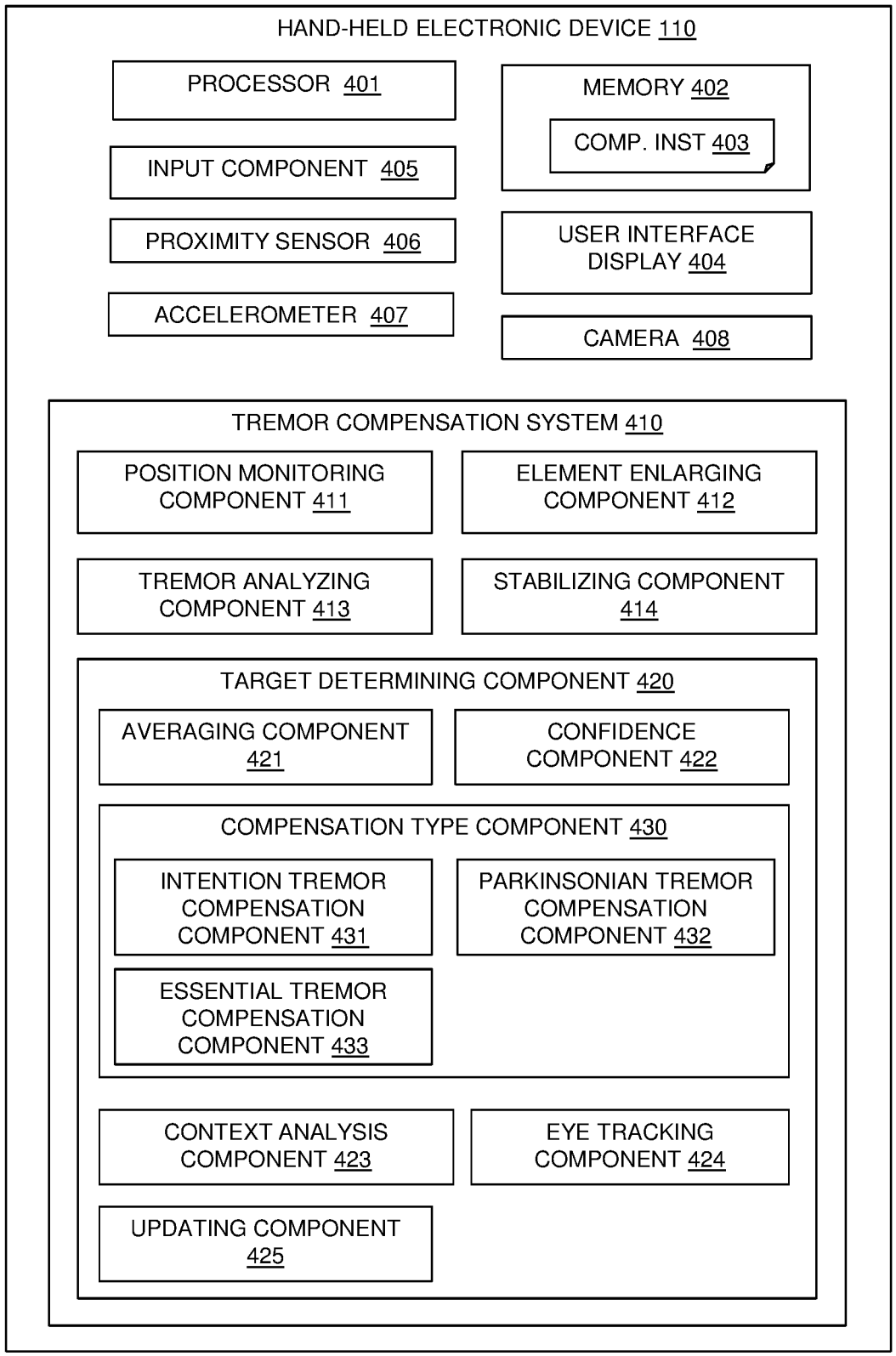
FIG. 4 is block diagram of an example embodiment of a system in accordance with the present invention.

Referring to FIG. 4, a block diagram shows an example hand-held electronic device 110 in which a tremor compensation system 410 is provided.

The hand-held electronic device 110 may include a processor 401, a hardware module, or a circuit for executing the functions of the described components which may be software units executing on the at least one processor 401. Memory 402 may be configured to provide computer instructions 403 to the at least one processor 401 to carry out the functionality of the components. The tremor compensation system 410 may be provided as part of an operating system of the device 110 or as an application for downloading onto the operating system of the device 110.

The hand-held electronic device 110 may include a user interface display 404 that may be in the form of a touch-screen display and an input component 405 for receiving inputs via the user interface by selection of graphical user interface control elements. For example, the input component 405 may include a representation of a keyboard for input of typed characters.

The hand-held electronic device 110 may include proximity sensors 406 for sensing a position of a user's finger in the three-dimensional space above the display 404. The proximity sensors 406 may be disposed as an array around the display 404. One example of such proximity sensors is capacitive sensors. Other embodiments may use a video camera or motion detecting devices. The proximity sensors 406 may detect movement over time of the user's finger as it approaches the display 404.

The hand-held electronic device 110 may include an accelerometer 407 for measuring the movement of the device 110 for use in providing stability as described further below. The hand-held electronic device 110 may include a camera 408 that may be used for eye tracking and/or finger position tracking.

The tremor compensation system 410 may include a position monitoring component 411 for monitoring position data provided by the proximity sensors 406 of a user's finger in relation to the user interface display over time as the finger approaches an element in the user interface display 404.

The tremor compensation system 410 may include a target determining component 420 for determining a target element by predicting an intended movement of the user's finger and an element enlarging component 412 for dynamically enlarging the determined target element in the user interface display as the user's finger approaches the user interface display 404.

The tremor compensation system 410 may include a tremor analyzing component 413 for analyzing the position data of the user's finger to determine a type of tremor in the finger. The tremor analyzing component 413 may analyze the position data of multiple instances of a user's finger movement when inputting elements in the user interface display 404 to build a picture of the nature of the tremor. The target determining component 420 may include a compensation type component 430 for selecting a compensation method for the type of tremor and using the compensation method in determining the intended element.

The target determining component 420 may include a updating component 425 for dynamically updating the determining of a target element as more position data becomes available as the finger approaches the user interface display 404 which may result in the element enlarging component 412 dynamically enlarging a new determined target element.

The target determining component 420 may include a context analysis component 423 for applying context analysis to aid in prediction of a next target element. The target determining component 420 may also include an eye tracking component 424 for tracking a movement of the user's eye using a camera 408 of the device 110 and using the tracking in determining an target element.

In one embodiment, the target determining component 420 includes an averaging component 421 for averaging position data of the finger in the (x,y) plane of the user interface display 404 as the finger approaches the user interface display and a confidence component 422 for applying a confidence coefficient to weight the averaging. A confidence coefficient weights the confidence of position data at different distances in direction (z) perpendicular to the (x,y) plane to provide a compensation method to accommodate different tremor types.

The compensation type component 430 may include the following compensation components. An intention tremor compensation component 431 for an intention tremor in which the movement of the finger becomes more erratic as the finger approaches the user interface display, and the confidence component 422 applies a greater confidence to the accuracy of earlier monitored positions of the user's finger. A Parkinsonian tremor compensation component 432 for a Parkinsonian tremor in which the movement of the finger becomes less erratic as the finger approaches the user interface display, and the confidence component 422 applies a lesser confidence to the accuracy of earlier monitored positions of the user's finger. An essential tremor compensation component 433 for an essential tremor in which the movement of the finger is constantly erratic as the finger approaches the user interface display, and the confidence component 422 applies an equal confidence to the accuracy of earlier monitored positions of the user's finger.

The tremor compensation system 410 may include a stabilizing component 414 for sensing a movement of the hand-held electronic device 110 using data from the accelerometer 407 and stabilizing the user interface display 404 relative to the device to compensate for the movement.

Figure 5:
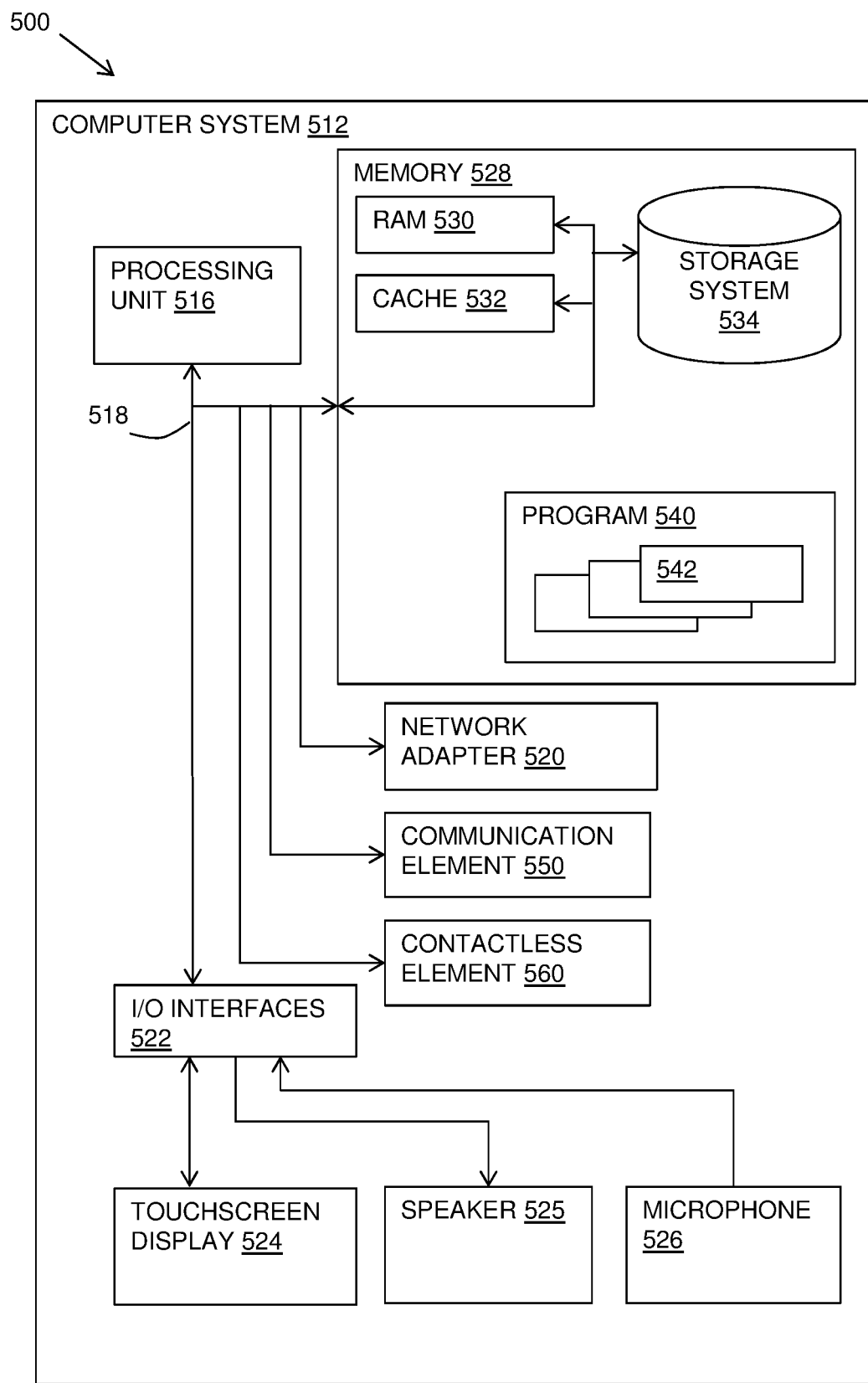
FIG. 5 is a block diagram of an embodiment of a computer system in which the present invention may be implemented.

Referring now to FIG. 5, a schematic of an example of a system 500 which may be a form of a computing device 512 with a touchscreen user interface on which the described system may be implemented. The computing device 512 may be a hand-held electronic device 110 as described.

The computer system 512 may be operational with numerous other general purpose or special purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, applications, objects, components, logic, data structures, and so on that perform particular tasks or implement particular abstract data types. The computer system 512 may be used in distributed cloud computing environments where tasks are performed by remote processing devices that are linked through a communications network. In a distributed cloud computing environment, program modules may be located in both local and remote computer system storage media including memory storage devices.

In FIG. 5, a computer system 512 is shown in the form of a general-purpose computing device. The components of the computer system 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 512 typically includes a variety of computer system readable media. Such media may be any available media that is accessible by computer system 512, and it includes both volatile and non-volatile media.

System memory 528 can include computer system readable media in the form of volatile memory, such as random access memory (RAM) 530 and/or cache memory 532. By way of example only, storage system 534 may be provided for reading from and writing to a non-removable, non-volatile magnetic media (not shown and typically called a "hard drive"). As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

The computer system 512 may include Input/Output (I/O) interfaces 522 that enable a user to interact with the computer system 512 via a touchscreen display 524. The computer system 512 may also communicate with any devices (e.g., network card, modem, etc.) that enable computer system 512 to communicate with one or more other computing devices. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518.

It should be understood that although not shown, other hardware and/or software components could be used in conjunction with the computer system 512. Examples, include, but are not limited to: a camera, microphone, speakers, etc.

The computing device 512 may be a communication device, such as a mobile smart phone, and the processing unit 516 may be a microprocessor for processing the functions of the communication device and the touchscreen display 524 may allow a user to see the phone numbers and other information and messages. The touchscreen display 524 may allow a user to input information into the device, a speaker 525 may allow the user to hear voice communication, music, etc., and a microphone 526 may allow the user to transmit his or her voice through the communication device.

The communication device may also include a communication element 550 for connection to communication channels including a cellular telephone network, data transmission, etc. The communication element 550 may include an associated wireless transfer element, such as an antenna.

The communication element 550 may include a subscriber identity module (SIM) in the form of an integrated circuit that stores an international mobile subscriber identity and the related key used to identify and authenticate a subscriber using the communication device. One or more subscriber identity modules may be removable from the communication device or embedded in the communication device.

The communication device may further include a contactless element 560, which is typically implemented in the form of a semiconductor chip (or other data storage element) with an associated wireless transfer element, such as an antenna. The contactless element 560 may be associated with (e.g., embedded within) the communication device and data or control instructions transmitted via a cellular network may be applied to the contactless element 560 by means of a contactless element interface (not shown). The contactless element interface may function to permit the exchange of data and/or control instructions between mobile device circuitry (and hence the cellular network) and the contactless element 560.

The contactless element 560 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device Y00 and an interrogation device. Thus, the communication device may be capable of communicating and transferring data and/or control instructions via both a cellular network and near field communications capability.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A system for compensating for user hand tremors when using a hand-held electronic device having a user interface display, comprising:
   a processor and a memory configured to provide computer program instructions to the processor to execute the function of the components:
   a position monitoring component for monitoring position data of a user's finger in relation to the user interface display over time as the finger approaches an element in the user interface display;
   a target determining component for determining a target element by predicting an intended movement of the user's finger;
   an element enlarging component for dynamically enlarging the determined target element in the user interface display as the user's finger approaches the user interface display;
   wherein the target determining component includes,
   an averaging component for averaging position data of the finger in the (x,y) plane of the user interface display as the finger approaches the user interface display; and
   a confidence component for applying a confidence coefficient to weight the averaging, wherein a confidence coefficient weights the confidence of position data at different distances in direction (z) perpendicular to the (x,y) plane to provide a compensation method to accommodate different tremor types.

2. The system as claimed in claim 1, including:
   a tremor analyzing component for analyzing the position data of the user's finger to determine a type of tremor in the finger; and
   a compensation type component for selecting a compensation method for the type of tremor and using the compensation method in determining the intended element.

3. The system as claimed in claim 1, wherein the target determining component includes an updating component for dynamically updating the determining of a target element as more position data becomes available as the finger approaches the user interface display, and wherein the element enlarging component dynamically enlarges a new determined target element.

4. The system as claimed in claim 2, wherein the compensation type component includes:
   an intention tremor compensation component for an intention tremor in which the movement of the finger becomes more erratic as the finger approaches the user interface display, and the compensation method applies a greater confidence to the accuracy of earlier monitored positions of the user's finger;
   a Parkinsonian tremor compensation component for a Parkinsonian tremor in which the movement of the finger becomes less erratic as the finger approaches the user interface display, and the compensation method applies a lesser confidence to the accuracy of earlier monitored positions of the user's finger; and
   an essential tremor compensation component for an essential tremor in which the movement of the finger is constantly erratic as the finger approaches the user interface display, and the compensation method applies an equal confidence to the accuracy of earlier monitored positions of the user's finger.

5. The system as claimed in claim 1, including:
   a stabilizing component for sensing a movement of the hand-held electronic device and stabilizing the user interface display relative to the device to compensate for the movement.

6. The system as claimed in claim 1, wherein the target determining component includes a context analysis component for applying context analysis to aid in prediction of a next target element.

7. The system as claimed in claim 1, wherein the target determining component includes an eye tracking component for tracking a movement of the user's eye and using the tracking in determining a target element.

8. The system as claimed in claim 1, wherein the determining a target element by the predicting of the intended movement of the user's finger includes applying context analysis to aid in a prediction of a next target element.

9. A computer program product for compensating for user hand tremors when using a hand-held electronic device having a user interface display, the computer program product comprising a computer readable storage medium having program instructions embodied therewith, the program instructions executable by a processor to cause the processor to:
   monitor position data of a user's finger in relation to the user interface display over time as the finger approaches an element in the user interface display;
   determine a target element by predicting an intended movement of the user's finger;
   dynamically enlarge the determined target element in the user interface display as the user's finger approaches the user interface display;
   average position data of the finger in the (x,y) plane of the user interface display as the finger approaches the user interface display; and
   apply a confidence coefficient to weight the averaging, wherein a confidence coefficient weights the confidence of position data at different distances in direction (z) perpendicular to the (x,y) plane to provide a compensation method to accommodate different tremor types.

10. The system as claimed in claim 8, wherein the applying context analysis applies n-gram analysis to predict a next letter or word.

* * * * *